3 Sheets—Sheet 1.

T. ROGERS,

Assignor, by mesne assignments, to R. S. DORSEY & M. E. BUNGER.

Harrow.

No. 9,561. Reissued Feb. 8, 1881.

*WITNESSES.*

James B. Ligius.

R. P. Daggett.

*INVENTOR.*

Timothy Rogers,

PER

C. Bradford,

ATTORNEY.

N. PETERS, PHOTO-LITHOGRAPHER, WASHINGTON, D. C.

T. ROGERS,

Assignor, by mesne assignments, to R. S. DORSEY & M. E. BUNGER.

Harrow.

No. 9,561. Reissued Feb. 8, 1881.

*WITNESSES.*

James B. Lyons.
R. P. Daggett.

*INVENTOR.*

Timothy Rogers,
PER
C. Bradford.
ATTORNEY.

N. PETERS, PHOTO-LITHOGRAPHER, WASHINGTON, D. C.

3 Sheets—Sheet 3.

T. ROGERS,

Assignor, by mesne assignments, to R. S. DORSEY & M. E. BUNGER.

Harrow.

No. 9,561. Reissued Feb. 8, 1881.

WITNESSES.

James. B. Lizius.
R. P. Daggett.

INVENTOR.

Timothy Rogers,
PER
C. Bradford,
ATTORNEY.

N. PETERS, PHOTO-LITHOGRAPHER, WASHINGTON, D. C.

UNITED STATES PATENT OFFICE.

TIMOTHY ROGERS, OF SPRINGFIELD, OHIO, ASSIGNOR, BY MESNE ASSIGNMENTS, TO ROBERT S. DORSEY AND MICHAEL E. BUNGER, OF INDIANAPOLIS, INDIANA.

HARROW.

SPECIFICATION forming part of Reissued Letters Patent No. 9,561, dated February 8, 1881.

Original No. 214,955, dated April 29, 1879. Application for reissue filed November 11, 1880.

*To all whom it may concern:*

Be it known that I, TIMOTHY ROGERS, of the city of Springfield, in the county of Clarke and State of Ohio, have invented certain new and useful Improvements in Harrows, of which the following is a specification.

The object of my said invention is to produce an iron-framed harrow which shall have certain advantages of convenience and construction; and it consists in a novel arrangement and construction of parts, as will be hereinafter more fully set forth.

Figure 1:
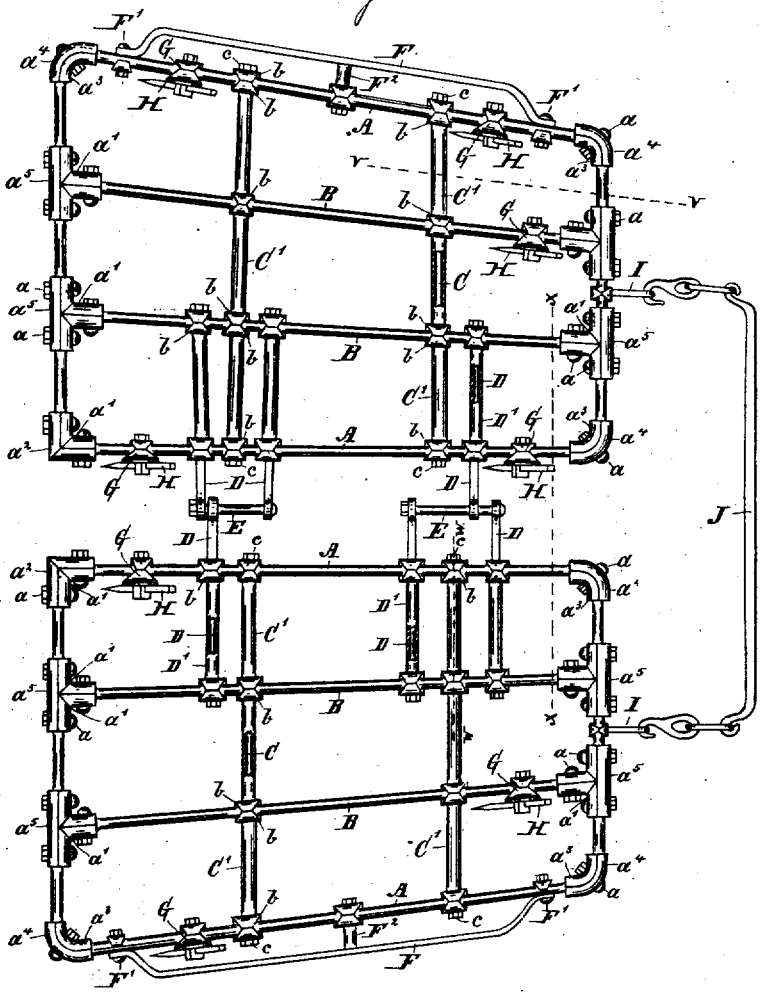
Figure 2:
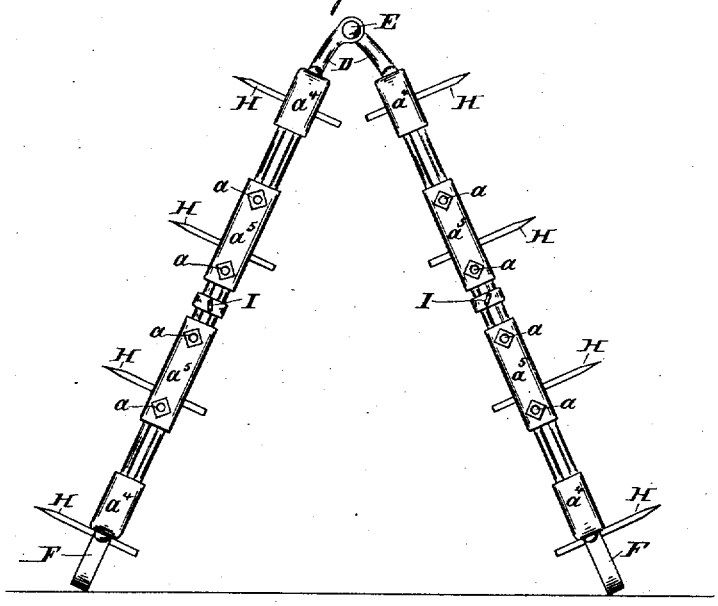
Figure 3:
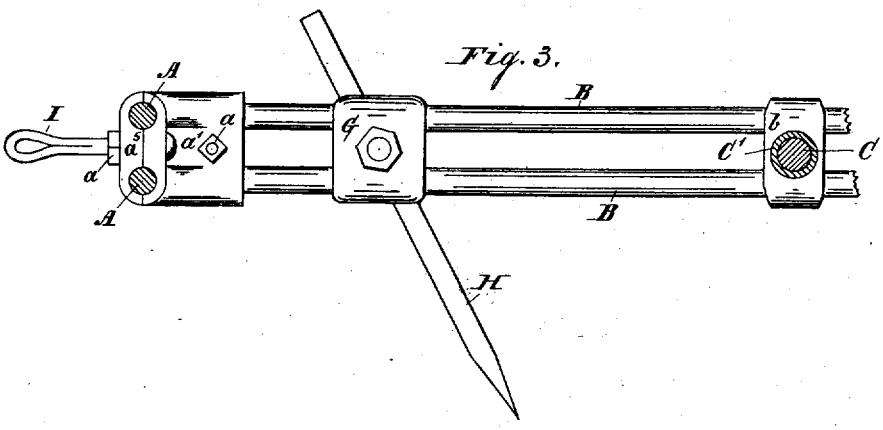
Figure 4:
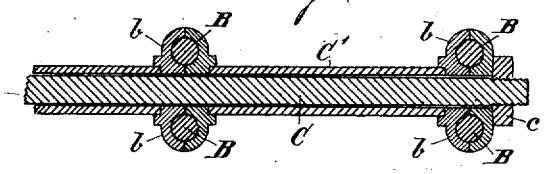
Figure 5:
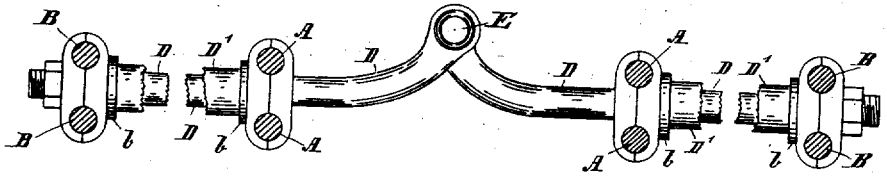
Figure 6:
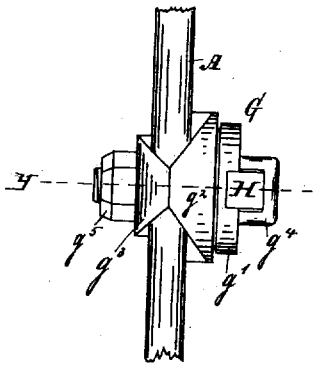
Figure 7:
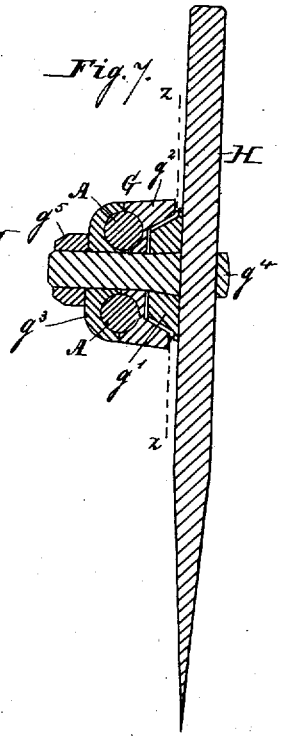
Figure 8:
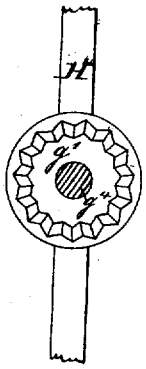
Figure 9:
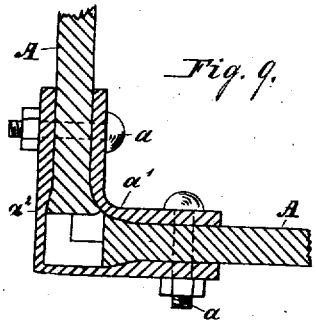

Referring to the accompanying drawings, which are made a part hereof, Figure 1 is a top or plan view of my improved harrow when open and in position for use. Fig. 2 is an end elevation when in position for transportation; Fig. 3, a view looking toward the center from the section-line *v v;* Fig. 4, a section on the dotted line *w w*, showing the construction of the bars C; Fig. 5, a view looking toward the center from the section-line *x x;* Fig. 6, a top end view of one of the harrow-teeth, its connections, and adjacent parts; Fig. 7, a section of Fig. 6 on the dotted line *y y;* Fig. 8, an elevation of the harrow-tooth and adjacent parts as seen from the section-line *z z* at the junction between the two parts of the device I, which come together at that point; Fig. 9, a horizontal section of the corner of the frame A, and Fig. 10 a vertical section of the same.

In said drawings, the portions marked A represent the rods which principally compose the outer frame-work of the harrow-sections, which rods are arranged in pairs, one vertically above the other and parallel therewith, and thus constitute a duplex frame-work, secured together as hereinafter described; B, similar rods, arranged in the same planes with the first, and forming the intermediate bars of the frame-work; C, single rods, which pass transversely between the bars B B, and, with the sleeves or sections of pipe C′ thereon, serve to brace and strengthen the other bars of the frame; D, bars or rods projecting from the sides of the harrow-sections, which form the hinge parts by which said sections are connected when secured together, and which, by being extended to the first of the bars B, as shown, with the aid of the sleeves D′ are rigidly and securely attached to the framework; E, the pivot-rods for the hinges; F, guards attached to the outer edges of the harrow, which serve the double purpose of preventing the clamps and nuts on the frame A from coming in contact with stumps, rocks, &c., and also as a runner upon which the harrow can be transported along the road, or from one field to another, without dragging it on the teeth or the necessity of loading it on some vehicle for that purpose; G, a four-part clamp, by which the harrow-teeth are secured to the frame; H, said harrow-teeth; I, eyebolts or hooks by which the double-tree by which the harrow is drawn is attached thereto, and J the said double-tree.

Figure 10:
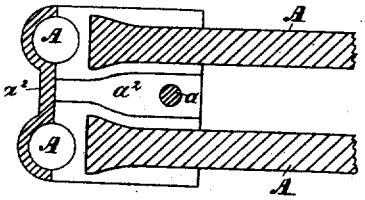

The outer frame is composed of continuous rods or bars A, which extend entirely around the harrow, and the two ends of which are secured together by a corner-clamp composed of an outer part, $a^2$, an inner part, $a'$, and bolts $a$. These bars are "upset," or slightly enlarged at the ends, and the openings in the clamps are correspondingly enlarged, as shown in Figs. 9 and 10, so that when the ends of the bars are secured in the clamps they cannot draw out. The other corners are strengthened and secured in place by the clamps composed of parts $a^3$ $a^4$.

The inner bars of the frames are composed of the straight rods B, secured, by clamps composed of the three parts $a'$ $a'$ $a^5$, to each other and to the outer frame-rods, A. The ends of these rods B should also be enlarged like those of the rods A. All these clamps are secured together by the bolts $a$.

The transverse bars, which serve to brace and strengthen the rods A B of the frame proper, are composed of sections of gas or other similar pipe C′, through which the bolt or rod C passes. The ends of the sections of pipe enter into annular recesses in the fittings $b$. The bolts C are provided at each end with nuts $c$.

The inner ends of the hinged parts D are provided with sleeves in much the same manner as the rods C, and are in like manner secured to the frame-rods A B. The hinge-bars D have an upward bend, so that one section of the harrow can be turned over on top of the other and lie down flat thereon, if occasion requires.

The teeth-clamps G are composed of two parts, $g'$ $g^2$, which fit upon the rods A or B, and one of which is ratchet-faced, and another part, $g^3$, also ratchet-faced upon one side to fit the part $g^2$, and having grooves upon the other to fit the harrow-tooth, and an eyebolt, $g^4$, into the eye of which the tooth is inserted, and which passes through the parts $g'$ $g^2$ $g^3$, and has a nut, $g^5$, upon the other end. By means of the ratchets the tooth can be adjusted to stand at any angle in either direction, and by means of the groove the teeth are held rigidly in the place in which they are put.

In transporting the harrow from one place to another it is folded, as shown in Fig. 2, and is drawn along after the manner of a sled on the runners F. The runners F are secured to the frame A by bolts $F'$ and $F^2$, the latter of which is similar to the rod C and its sleeve, and may, if desired, be a continuation thereof, and suitable clamps and nuts, as shown in Fig. 1.

As will be readily understood from the foregoing description, a large or small number of teeth can be employed in this harrow, as may be desired, and they can readily be changed from a vertical to an angular position in either direction, or vice versa, as may be best suited to the user's purpose. They can also be made to occupy any desired position with relation to each other within the limit of their adjustment.

Having thus fully described my said invention, what I claim as new, and desire to secure by Letters Patent, is—

1. The outer rails, A, of a harrow-frame, composed of continuous rods or bars, bent as shown, and having their ends secured by clamps $a'$ $a^2$, substantially as set forth.

2. In a harrow-frame, the combination of two rods, A A, arranged vertically one above the other, and forming the outer rails of said frame, and clamps by which said rods are secured together and retained in position, substantially as shown and specified.

3. The combination, in a harrow, with the duplex rods A A B B, of transverse connecting-bars composed of sections of pipe secured between fittings $b$ $b$, which inclose said duplex rods, and bolts which pass through said sections of pipe and said fittings and between said duplex rods, all substantially as shown and specified.

4. In a harrow, the combination, with the duplex rods composing the frame and having enlarged ends, of clamps provided with openings of similar formation, which are thus adapted to receive and securely hold said ends, and thus secure the frame together, substantially as set forth.

In witness whereof I have hereunto set my hand and seal at Springfield, Ohio, this 3d day of November, A. D. 1880.

TIMOTHY ROGERS. [L. S.]

Witnesses:
B. C. CONVERSE,
J. N. NORMAND.